United States Patent
Chang et al.

(10) Patent No.: US 10,511,736 B1
(45) Date of Patent: Dec. 17, 2019

(54) DOCUMENT SIZE SENSING MODULE

(71) Applicant: Kinpo Electronics, Inc., New Taipei (TW)

(72) Inventors: Tzu-Cheng Chang, New Taipei (TW); Hung-Huan Sung, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 16/149,062

(22) Filed: Oct. 1, 2018

(30) Foreign Application Priority Data

Jul. 23, 2018 (CN) .......................... 2018 1 0811134

(51) Int. Cl.
*H04N 1/00* (2006.01)

(52) U.S. Cl.
CPC ....... *H04N 1/0071* (2013.01); *H04N 1/00559* (2013.01); *H04N 1/00713* (2013.01); *H04N 1/00734* (2013.01); *H04N 1/00758* (2013.01); *H04N 2201/0094* (2013.01)

(58) Field of Classification Search
CPC ............. H04N 1/0071; H04N 1/00559; H04N 1/00713; H04N 1/00734; H04N 1/00758; H04N 2201/0094
USPC ....................................................... 358/449
See application file for complete search history.

(56) References Cited

U.S. PATENT DOCUMENTS

| 5,818,976 A | 10/1998 | Pasco et al. |
| 6,005,683 A | 12/1999 | Son et al. |
| 6,753,982 B1 | 6/2004 | Sheng et al. |
| 7,164,881 B2* | 1/2007 | Donovan ............ G03G 15/5029 399/370 |
| 9,944,097 B1* | 4/2018 | Younis .................. H04N 1/0032 |
| 2005/0185013 A1* | 8/2005 | Tanabe ................... B41J 13/025 347/19 |
| 2008/0212989 A1* | 9/2008 | Nagata ............... G03G 15/0868 399/61 |
| 2009/0034028 A1* | 2/2009 | Akahane ............ H04N 1/00559 358/497 |
| 2010/0245859 A1* | 9/2010 | Morgan ............. H04N 1/00708 358/1.9 |
| 2013/0164027 A1* | 6/2013 | Sato .................... G03G 21/1633 399/110 |

(Continued)

FOREIGN PATENT DOCUMENTS

KR          100338082          5/2002

*Primary Examiner* — Allen H Nguyen
(74) *Attorney, Agent, or Firm* — JCIPRNET

(57) ABSTRACT

A document size sensing module adapted to a MFP having a transparent platform where a document is adapted to be placed is provided and includes a moving component movably disposed below the transparent platform along a first axial direction, a first sensor, a second sensor, and a control unit electrically connected to the moving component, the first sensor, and the second sensor. The first and second sensors are disposed on the moving component and arranged along a second axial direction. When the control unit drives the moving component to move along the first axial direction, and at least one of the first sensor and the second sensor senses the document, the control unit determines a length of the document according to a distance travelled by the moving component and a width of the document by the first sensor and the second sensor, so as to determine dimensions of the document.

9 Claims, 4 Drawing Sheets

(56) References Cited

U.S. PATENT DOCUMENTS

2013/0315618 A1* 11/2013 Koishi ............... G03G 21/1842
399/110
2015/0316876 A1* 11/2015 Takematsu ............... B65H 5/26
399/322
2016/0307076 A1* 10/2016 Muthupandi ........ G06K 15/181

* cited by examiner

| No. | Size | Dimensions (W × L) | Transmission distance | 1 | 2 |
|---|---|---|---|---|---|
| 1 | A3 SEF | 297x420mm | 49mm | ● | ● |
| 2 | A4 SEF | 210x297mm | 127mm | ● | ● |
| 3 | A4 LEF | 297x210mm | 259mm | ● | ● |
| 4 | A5 SEF | 148x210mm | 259mm | ● | |
| 5 | A5 LEF | 210x148mm | 321mm | ● | ● |
| 6 | A6 SEF | 105x148mm | 321mm | ● | |
| 7 | A6 LEF | 148x105mm | 364mm | ● | |
| 8 | B4 SEF | 257x364mm | 105mm | ● | ● |
| 9 | B5 SEF | 182x257mm | 212mm | ● | ● |
| 10 | B5 LEF | 257x182mm | 287mm | ● | ● |
| 11 | B6 SEF | 128x182mm | 287mm | ● | |
| 12 | B6 LEF | 182x128mm | 341mm | ● | ● |
| 13 | Letter SEF | 216x279mm | 190mm | ● | ● |
| 14 | Letter LEF | 279x216mm | 100mm | ● | ● |

FIG. 5

DOCUMENT SIZE SENSING MODULE

CROSS-REFERENCE TO RELATED APPLICATION

This application claims the priority benefit of China application serial no. 201810811134.X, filed on Jul. 23, 2018. The entirety of the above-mentioned patent application is hereby incorporated by reference herein and made a part of this specification.

BACKGROUND

Technical Field

The disclosure relates to a document size sensing module of a multi-function product (MFP).

Description of Related Art

Generally, when a multi-function product (MFP) capable of performing a paper-feeding function is being used, manual operations performed on an operation panel of the MFP are often necessary to manually select required dimensions of a paper, which is disadvantageous for document processing efficiency. If the MFP may actively sense the size of the incoming paper at the time when the paper is being fed, the user need not manually select the dimensions of paper through the operation panel of a computer or the MFP, thereby simplifying and facilitating the operation of the MFP. In view of the above, a photo sensor or a photo intemipter for sensing the size of the paper during document processing has been developed according to the related art.

Although the aforesaid existing design allows the diverse dimensions of paper to be effectively sensed, the diversity of dimensions requires more and more photo sensors (or photo interrupters) for effectively sensing the dimensions. Besides, the photo sensor (or the photo interrupter) is costly and may be easily damaged for many reasons; hence, considerable costs may be expected in terms of fabrication and maintenance.

The MFP with a scanning module is also exemplified herein. In order to determine the dimensions of a document, an irradiation beam provided by the scanning module may be applied to irradiate the document before scanning the document, and the dimensions of the document may be determined through a sensing action of the scanning module. However, such an irradiation action takes place after a user lifts a top cover of the MFP and places a piece of paper on the MFP. Consequently, the user has to look at the irradiation beam directly, which is likely to cause discomfort to the user's eyes. Moreover, the scanning module is required to perform calculations and can then determine the dimensions of the document, thus increasing the overall operation time.

As such, how to increase the efficiency of sensing the dimensions of documents by properly adjusting the structure and the configuration of the MFP without posing any negative impact on the user is an issue to be resolved by people skilled in the pertinent art.

SUMMARY

The disclosure is directed to a document size sensing module adapted to a multi-function product (MFP) for improving processing efficiency of the MFP and preventing discomfort to users to a greater extent.

In an embodiment of the invention, a document size sensing module, adapted to an MFP is provided. The MFP has a transparent platform on which a document is adapted to be placed. The document size sensing module includes a moving component, a first sensor, a second sensor, and a control unit. The moving component is movably disposed below the transparent platform along a first axial direction. The first sensor and the second sensor are respectively disposed on the moving component and arranged along a second axial direction. The control unit is electrically connected to the moving component, the first sensor, and the second sensor. When the control unit drives the moving component to move along the first axial direction, and at least one of the first sensor and the second sensor senses the document, the control unit determines a length (L) of the document according to a distance travelled by the moving component along the first axial direction and determines a width (W) of the document by the first sensor and the second sensor, so as to determine dimensions of the document.

Based on the above, the MFP equipped with the document size sensing module is able to complete the step of sensing the dimensions of the document before processing the document. In other words, through the first sensor and the second sensor disposed on the moving component, the control module is able to determine the dimensions of the document placed on the transparent platform according to a sensing state of the first sensor and the second sensor while the control module drives the moving component to move along the first axial direction, based on which the document can then be processed.

BRIEF DESCRIPTION OF THE DRAWINGS

The accompanying drawings are included to provide a further understanding of the embodiment, and are incorporated in and constitute a part of this specification. The drawings illustrate embodiments and, together with the description, serve to explain the principles provided in one or several embodiments.

FIG. 5 is a table showing a corresponding relationship between dimensions of documents and sensors.

DETAILED DESCRIPTION OF EMBODIMENTS

Figure 1:
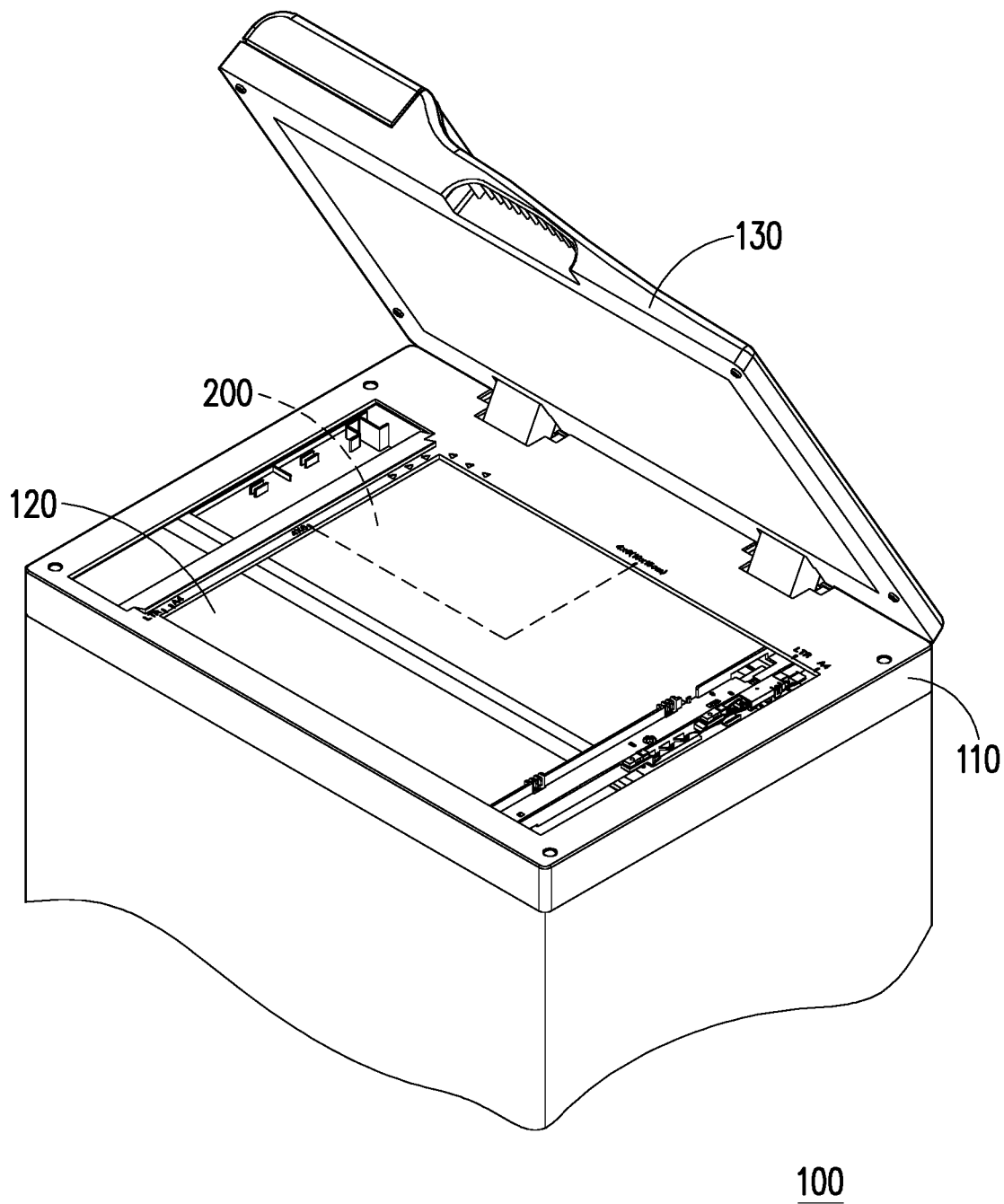
FIG. 1 is a schematic view of a multi-function product (MPF) according to an embodiment of the invention.

Reference will now be made in detail to the present embodiments of the invention, examples of which are illustrated in the accompanying figures. Wherever possible, the same reference numbers are used in the drawings and the description to refer to the same or like parts.

Figure 2:
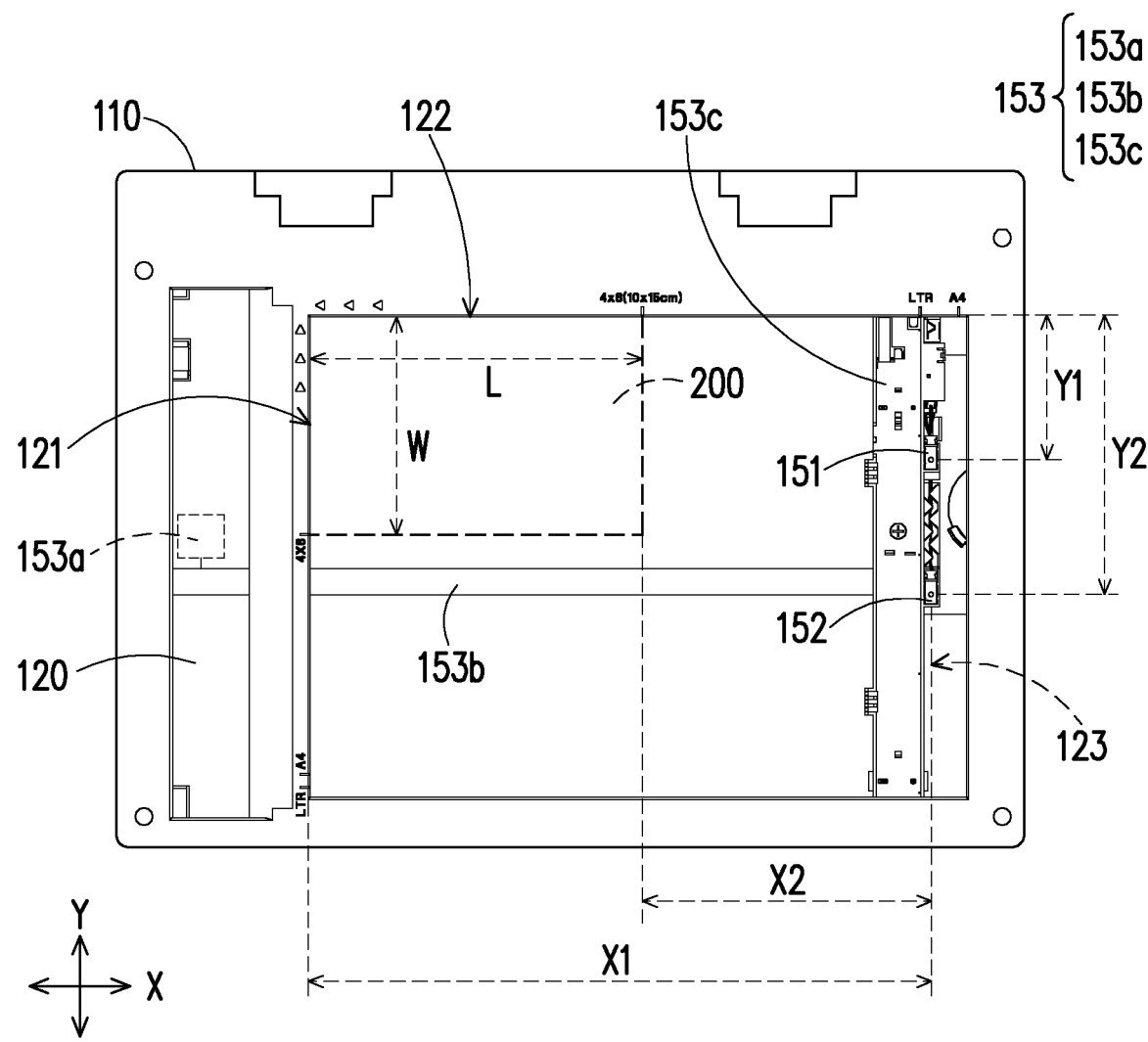
FIG. 2 is a top view of a portion of the MFP depicted in FIG. 1.
Figure 3:
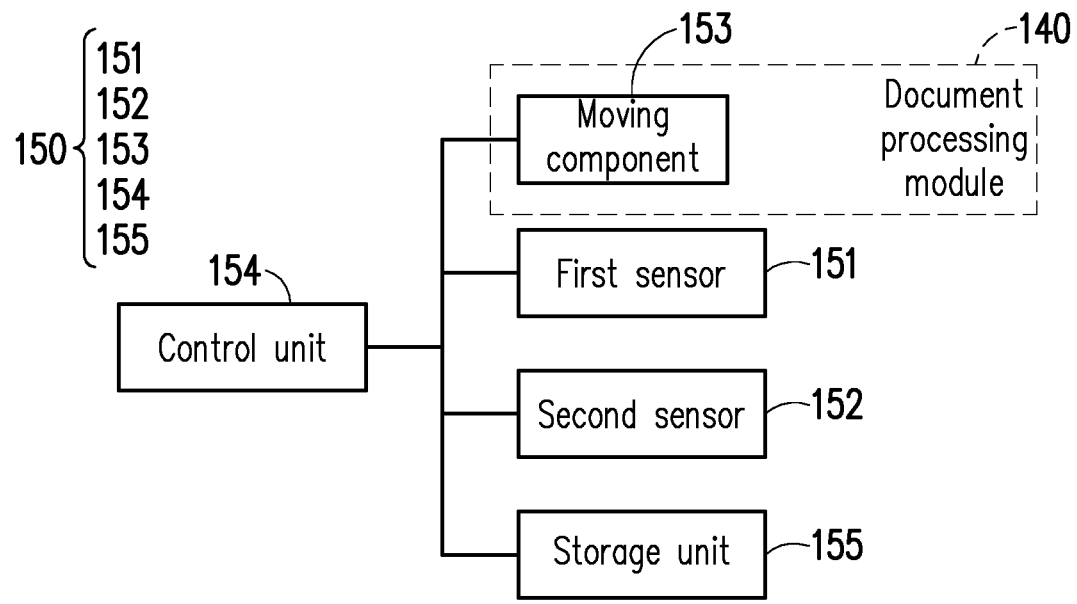
FIG. 3 shows an electrical connection relationship of some components of the MFP depicted in FIG. 1.

FIG. 1 is a schematic view of a multi-function product (MPF) according to an embodiment of the invention. FIG. 2 is a top view of a portion of the MFP depicted in FIG. 1. FIG. 3 shows an electrical connection relationship of some components of the MFP depicted in FIG. 1. With reference to FIG. 1 to FIG. 3, in the present embodiment, an MFP/printer/peripheral 100 is a known office automation device that integrates various functions including but not limited to photocopying, faxing, scanning, and printing. The MFP 100 includes a machine 110, a transparent platform 120, a top cover 130, a document processing module 140, and a document size sensing module 150. The transparent platform 120 is disposed on the machine 110, and the top cover 130 is pivoted to the machine 110, so that the top cover 130 can be rotatably opened or closed relative to the transparent platform 120. A document 200 (e.g., paper) is adapted to be placed on the transparent platform 120, and the document processing module 140 is disposed in the machine 110 and located below the transparent platform 120, so as to process the document 200 placed on the transparent platform 120 (e.g., fax, scan, or photocopy the document 200).

Thereby, the dimensions of the document 200 on the transparent platform 120 may be learned before the document 200 is processed, which is conducive to the improvement of the document processing efficiency. Since the MFP 100 provided in the present embodiment is equipped with the document size sensing module 150, said requirements can be complied with.

In the present embodiment, the document size sensing module 150 includes a moving component 153, a first sensor 151, a second sensor 152, and a control unit 154. The moving component 153 is movably disposed below the transparent platform 120 along a first axial direction X, the first sensor 151 and the second sensor 152 are respectively disposed on the moving component 153 and arranged along a second axial direction Y, and the control unit 154 is electrically connected to the moving component 153, the first sensor 151, and the second sensor 152. Here, the control unit 154 has driving capabilities, logic decision capabilities, and capability of processing relevant electronic messages, and the first axial direction X is orthogonal to the second axial direction Y. In general, in the devices equipped with a scanning module, e.g., a scanner, an MFP, a photocopier, and so on, the two axial directions X and Y are orthogonal to each other.

According to the present embodiment, the moving component 153 includes moving member 153c, a transmission member 153b, and a power source 153a. For instance, the power source 153a is a motor disposed below the transparent platform 120 and electrically connected to the control unit 154. The transmission member 153b is constituted by driver gears and a belt, for instance. The moving member 153c extends along the second axial direction Y, and the transmission member 153b is connected between the power source 153a and the moving member 153. Hence, through the arrangement of the moving member 153c, the transmission member 153b, and the power source 153a; the moving member 153c (and the first sensor 151 and the second sensor 152 on the moving member 153c) may be driven to move back and forth along the first axial direction X.

Based on said arrangement, when the control unit 154 drives the moving component 153 to move along the first axial direction X, the control unit 154 is able to determine the dimensions of the document 200 through a sensing state of the first sensor 151 and the second sensor 152.

Figure 4:
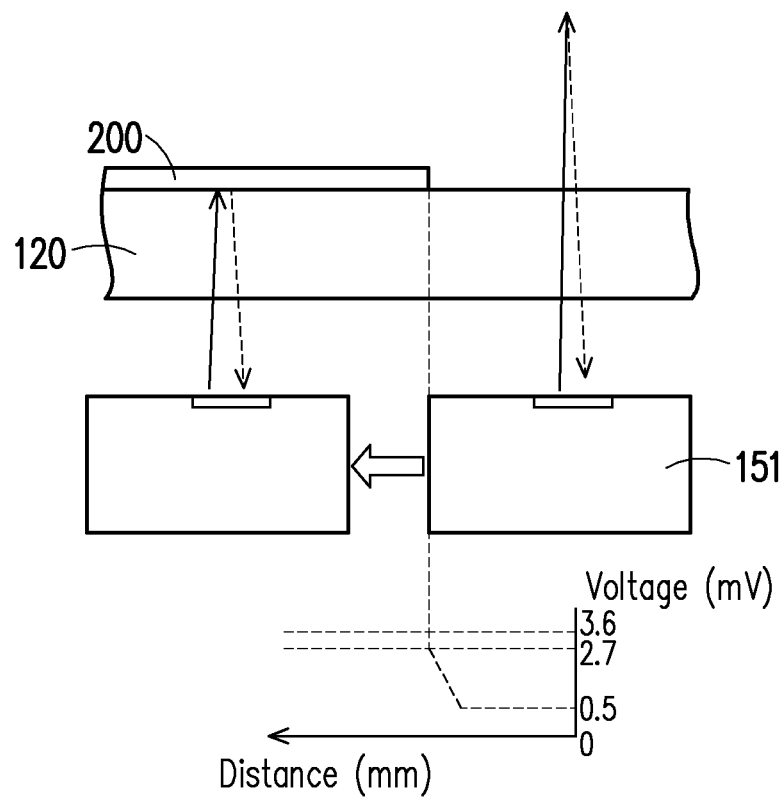
FIG. 4 is a schematic view of a sensor sensing a document.

FIG. 4 is a schematic view of a sensor sensing a document. Here, the sensor refers to the first sensor 151, for instance (the second sensor 152 may also be applied, and therefore no repeated explanation will be further provided). In the present embodiment, the first sensor 151 and the second sensor 152 are photo sensors electrically connected to the control unit 154, respectively, so as to allow the control unit 154 to determine whether the document is sensed according to variations in a sensing voltage of the photo sensors. Here, a light sensing focal length of the photo sensor is 3 mm to 10 mm. As shown in FIG. 4, if the input sensing voltage is 3.6 mV, and when the first sensor 151 has not yet passed through the document 200, a relatively large voltage drop may be generated, e.g., the sensing voltage may drop from 3.6 mV to 0.5 mV. When the first sensor 151 is moved below the document 200, a relatively small voltage drop may be generated, e.g., the sensing voltage drops from 3.6 mV to 2.7 mV. As such, whether the first sensor 151 senses the document 200 may be learned according to the variations in the voltage.

With reference to FIG. 2 and FIG. 3, it should be further explained that the moving component 153 provided in the present embodiment is substantially a part of the document processing module 140, i.e., the moving component 153 is part of a contact image sensor (CIS) module in the MFP 100.

Here, the CIS module is a photoelectric conversion device, and the operating principle of the CIS module is that, when the MFP 100 scans the document, the CIS module is applied to sense the light reflected by the document after the document is irradiated by an internal scanning light source, and a photo signal is converted into an electrical signal. After that, the control unit 154 converts the electrical signal into a digital signal and transmits the digital signal to a computer, so as to complete the whole process of scanning the document.

Thereby, through the arrangement of the first sensor 151 and the second sensor 152 on the CIS module, the space occupied by the machine 110 below the transparent platform 120 may be effectively reduced, so as to increase the utilization rate of the space. Certainly, in another embodiment that is not shown in the drawings, the moving component 153 holding the first sensor 151 and the second sensor 152 may also be disposed in addition to the CIS module according to actual requirements, and the effects of sensing the dimensions of the document can also be achieved.

On the other hand, in the present embodiment, the CIS module is not applied to sense whether the document exists. This is because the light sensing focal length of the CIS module is relatively short (approximately 0.1 mm to 0.3 mm), and therefore more restrictions are imposed on the document requirements. When the sensing accuracy of the CIS module is relatively high, and the CIS module is mainly applied to scan the texts or images on the document, which requires more calculation time. As such, if the CIS module is applied to sense whether the document exists and sense the dimensions of the document, the increase in the sensing and calculation time leads to the reduced efficiency. Certainly, in another embodiment that is not shown in the drawings, it is likely to further place a moving component below the transparent platform 120, and the moving component is different from the aforesaid CIS module.

The features of sensing the dimensions of the document 200 by the first sensor 151 and the second sensor 152 are elaborated hereinafter.

With reference to FIG. 1 and FIG. 2, in the present embodiment, the transparent platform 120 has a first reference side 121, and a second reference side 122 adjacent and orthogonal to each other and a corresponding side 123 opposite to the first reference side 121. Users are used to place the document 200 on the transparent platform 120, enable one side of the document 200 to be aligned to the first reference side 121, and enable another side of the document 200 (adjacent to said one side) to be aligned to the second reference side 122, so as to complete the preparations before the document 200 is being processed. Note that when the user lifts the top cover 130, the control unit 154 drives the moving member 153c of the moving component 153 to move to the corresponding side 123 and stay there; at this time, the first sensor 151 and the second sensor 152 are not actuated, as shown in FIG. 2. Thereafter, during the process of moving the top cover 130 back to the transparent platform 120 by the user, the control unit 154 drives the moving member 153c to move from the corresponding side 123 toward the first reference side 121, the first sensor 151 and the second sensor 152 are activated, and the dimensions of the document 200 are determined according to the sensing state. That is, during the process of closing the top cover 130 by the user, the MFP 100 is able to complete the action of sensing the dimensions of the document 200.

As to a length L of the document 200, when the moving member 153c of the moving component 153 moves along the first axial direction X, and at least one of the first sensor 151 and the second sensor 152 senses the document 200, the control unit 154 may determine the dimensions of the document 200 along the first axial direction X according to a distance travelled by at least one of the first sensor 151 and the second sensor 152 along the first axial direction X, i.e., the length L of the document 200.

To be specific, since the first reference side 121 and the corresponding side 123 are located on the path where the moving component 153 moves along the first axial direction X, a distance X1 exists between the first reference side 121 and the corresponding side 123. When at least one of the first sensor 151 and the second sensor 152 senses the document 200, the moving component 153 is driven by the control unit 154 to move from the corresponding side 123 toward the first reference side 121 by a transmission distance X2 that is already generated. As such, the length L of the document 200 is a difference obtained by subtracting the transmission distance X2 from the distance X1 (L=X1−X2).

As to a width W of the document 200, with reference to FIG. 3, the document size sensing module 150 provided in the present embodiment further includes a storage unit 155, which is a memory or another electronic device, for instance, and the storage unit 155 is electrically connected to the control unit 154 and configured to store the dimensions of the documents 200. FIG. 5 is a table showing a corresponding relationship between dimensions of documents and sensors. The dimensions are input and stored into the storage unit 155. After the control unit 154 obtains the sensing state of the first sensor 151 and the second sensor 152, the width W of the document 200 may be obtained by referring to the dimensions of the documents 200 stored in the storage unit 155.

Specifically, the dimensions (in W×L) shown in FIG. 5 are taken as an example and include an A3 size, an A4 size, an A5 size, an A6 size, a B4 size, a B5 size, a B6 size, and a Letter size. Even if the documents 200 are in the same size, the determination of dimensions may be affected because the documents are placed in different orientations, which should be taken into consideration while referring to FIG. 5. In the table, "SEF" represents short edge feed, i.e., the short side of the document 200 is aligned to the first reference side 121 and serves as the width W; by contrast, "LEF" represents long edge feed, i.e., the long side of the document 200 is aligned to the first reference side 121 and serves as the width W.

Furthermore, in the table shown in FIG. 5, the columns 1 and 2 on the right side show black dots indicating the sensing state of the first sensor 151 (shown as 1 in the table) and the second sensor 152 (shown as 2 in the table). The existence of the black dot represents that the sensor senses the document 200, and non-existence of the black dot represents that the sensor does not sense the document 200.

Thereby, the control unit 154 is able to correspondingly obtain the dimensions of the document 200 according to the sensing state.

Note that the table in FIG. 5 further indicates the transmission distance, i.e., the aforesaid transmission distance X2, whereby the control unit 154 may determine the dimensions more quickly while corresponding actions are being performed.

In order to enable the first sensor 151 and the second sensor 152 to well determine the dimensions, according to the present embodiment, the locations of the first sensor 151 and the second sensor 152 are limited as follows.

After the dimensions of the documents 200 are learned, the dimensions of the document 200 occupying the smallest area are selected from the dimensions of the documents 200 on the basis of the second reference side 122, the area (AR1)=a first size (D1)× a second size (D2), and a first distance Y1 existing between the first sensor 151 and the second reference side 122 is less than a smaller one of the first size (D1) and the second size (D2), i.e., Y1<min(D1, D2). Next, the dimensions of the document 200 occupying the second smallest area are selected from the dimensions of the documents 200, the area (AR2)=a third size (D3)×a fourth size (D4), and a second distance Y2 existing between the second sensor 152 and the second reference side 122 is greater than the smaller one of the first size (D1) and the second size(D2) and is less than a greater one of the third size (D3) and the fourth size (D4), i.e., min(D1, D2)<distance (Y2)<max(D3, D4).

For instance, among the dimensions shown in FIG. 5, the smallest area is the A6 size, and the second smallest area is the B6 size. As such, the first distance Y1 existing between the first sensor 151 and the second reference side 122 is smaller than the smaller one of 105 mm and 148 mm, i.e., Y1<105 mm. The second distance Y2 existing between the second sensor 152 and the second reference side 122 is greater than the smaller one of 105 mm and 148 mm, i.e., Y2>105 mm, and the second distance Y2 is smaller than the greater one of 128 mm and 182 mm, i.e., Y2<182 mm. Thus, 105 mm<Y2<182 mm is obtained, and the configurations of the first sensor 151 and the second sensor 152 are completely set. The configurations are not limited herein and may vary according to the dimensions of the document 200; that is, the configurations need be properly adjusted according to the amount of infouniation stored in the storage unit 155 in association with the dimensions.

According to said locations of the first sensor 151 and the second sensor 152, 14 possible variations of the dimensions and the orientations shown in FIG. 5 may be effectively distinguished, so as to complete the action of sensing the dimensions.

Here, the A4 LEF size and the A5 SEF size are taken as examples, and the distance X1 between the first reference side 121 and the corresponding side 123 along the first axial direction X is 469 mm. On this condition, when the control unit 154 drives the moving component 153 as well as the first sensor 151 and the second sensor 152 on the moving component 153 to move along the first axial direction X from the corresponding side 123 toward the first reference side 121, and when the transmission distance X2 is 259 mm, at least one of the first sensor 151 and the second sensor 152 senses the document 200. At this time, the control unit 154 is able to determine that the length L of the document 200 is 210 mm according to the table shown in FIG. 5. Thereafter, during the subsequent movement along the first axial direction X, both the first sensor 151 and the second sensor 152 can sense the document 200, and the control unit 154 is able to determine that the dimension of the document 200 is A4 LEF according to the table shown in FIG. 5. By contrast, if only the first sensor 151 may sense the document 200, but the second sensor 152 cannot sense the document 200, the control unit 154 may learn that the dimension of the document 200 is A5 SEF according to the table shown in FIG. 5.

It can be learned from the table in FIG. 5 that the maximum transmission distance X2 of the moving component 153 is the dimensions of the document occupying the smallest area, which indicates that the moving component 153 is able to complete the action of sensing the dimensions of the document in no need of traveling the whole length of the transparent platform 120, i.e., the distance X1. Hence, the moving efficiency of the document size sensing module 150 can be effectively improved, and the document processing efficiency of the MFP 100 can be indirectly increased.

Note that the dimensions of the document are not limited to those provided herein, and designers may expand the storage information shown in FIG. 5 according to the required dimensions of the document 200. In other words, during the process of designing the MFP, the types and the number of dimensions of to-be-sensed documents may be determined at first, so as to further plan the layout of the first sensor 151 and the second sensor 152.

To sum up, the MFP equipped with the document size sensing module is able to complete the step of sensing the dimensions of the document before processing the document. In other words, through the first sensor and the second sensor disposed on the moving component, the control module is able to determine the dimensions of the document placed on the transparent platform according to the sensing state of the first sensor and the second sensor while the control module drives the moving component to move along the first axial direction, based on which the document can then be processed.

Particularly, in the first axial direction, the length of the document may be learned according to the distance generated when the first sensor and the second sensor senses the document. Furthermore, by first obtaining the dimensions of the documents, the locations of the first sensor and the second sensor in the second axial direction may be determined. As such, during the movement, whether the first sensor and the second sensor senses the document, the known lengths and dimensions may contribute to the determination of the dimensions of the document. Given that the length of the document stays the same, and the dimensions of different documents may be learned through sensing the documents with different widths. Thereby, the sensors are able to determine the dimensions of the document without the need of completely scanning the whole document, so as to effectively improve the moving efficiency of the document size sensing module and increase the document processing efficiency of the MFP.

Although the disclosure has been described with reference to the embodiments, it will be apparent to one of the ordinary skills in the art that modifications to the described embodiments may be made without departing from the spirit of the invention. Accordingly, the scope of protection will be defined by the attached claims rather than by the above detailed description.

What is claimed is:

1. A document size sensing module of a multi-function product, the multi-function product having a transparent platform where a document is adapted to be placed, the document size sensing module comprising:
    a moving component disposed below the transparent platform and comprising a moving member, wherein the moving member is movable along a first axial direction and extends along a second axial direction;
    a first photo sensor disposed on the moving member;
    a second photo sensor disposed on the moving, the first photo sensor and the second photo sensor being arranged along the second axial direction; and
    a control unit electrically connected to the moving component, the first photo sensor, and the second photo sensor, wherein when the control unit drives the moving member to move along the first axial direction, and when at least one of the first photo sensor and the second photo sensor senses the document, the control unit determines a length (L) of the document according to a distance travelled by the moving member along the first axial direction and determines a width (W) of the document by the first photo sensor and the second photo sensor, so as to determine dimensions of the document (W×L).

2. The document size sensing module as recited in claim 1, wherein the transparent platform has a first reference side and a corresponding side opposite to the first reference side, the first reference side and the corresponding side is disposed along the first axial direction, a distance (X1) existing between the first reference side and the corresponding side, and one edge of the document is adapted to be aligned to the first reference side, wherein the control unit drives the moving member to move from the corresponding side toward the first reference side by a transmission distance (X2), the transmission distance X2 is a distance travelled by the moving member from the corresponding side until at least one of the first photo sensor and the second photo sensor senses the document, and the length (L) of the document is a difference obtained by subtracting the transmission distance (X2) from the distance (X1) (L=X1−X2).

3. The document size sensing module as recited in claim 1, further comprising a storage unit electrically connected to the control unit and configured to store dimensions of the documents, and the control unit compares the sensing state of the first photo sensor and the second photo sensor with the dimensions of the documents to obtain the width (W) of the document.

4. The document size sensing module as recited in claim 3, wherein the transparent platform has a second reference side disposed along the second axial direction, and another edge of the document is adapted to be aligned to the second reference side, wherein the dimensions of the documents comprise the document occupying a smallest area (AR1), the area (AR1)=a first size (D1)×a second size (D2), a first distance (Y1) exists between the first photo sensor and the second reference side along the second axial direction, and the first distance (Y1) is less than a smaller one of the first size (D1) and the second size (D2) (Y1<min(D1, D2)).

5. The document size sensing module as recited in claim 4, wherein the dimensions of the documents comprise a document occupying a second smallest area (AR2), the area (AR2)=a third size (D3)×a fourth size (D4), a second distance (Y2) exists between the second photo sensor and the second reference side along the second axial direction, and the second distance (Y2) is greater than the smaller one of the first size (D1) and the second size (D2) and is less than a greater one of the third size (D3) and the fourth size (D4) (min(D1, D2)<distance (Y2)<max(D3, D4)).

6. The document size sensing module as recited in claim 3, wherein the dimensions of the documents comprise an A3 size, an A4 size, an A5 size, an A6 size, a B4 size, a B5 size, a B6 size, and a Letter size.

7. The document size sensing module as recited in claim 1, wherein the first photo sensor and the second photo sensor are photo sensors electrically connected to the control unit, respectively, and the control unit determines whether the document is sensed according to variations in a sensing voltage of the photo sensors.

8. The document size sensing module as recited in claim 7, wherein a light sensing focal length of the photo sensor is 3 mm to 10 mm.

9. The document size sensing module as recited in claim 1, wherein the moving component is part of a contact image sensor module, and the contact image sensor module is disposed in the multi-function product.

\* \* \* \* \*